United States Patent [19]

Hofinger et al.

[11] Patent Number: 4,734,523
[45] Date of Patent: Mar. 29, 1988

[54] OXALKYLATED POLYESTER-AMINES, A PROCESS FOR THEIR PREPARATION AND THEIR USE

[75] Inventors: Manfred Hofinger; Willibald Böse, both of Burgkirchen; Martin Hille, Liederbach; Roland Böhm, Kelkheim; Friedrich Staiss, Wiesbaden, all of Fed. Rep. of Germany

[73] Assignee: Hoechst Aktiengesellschaft, Frankfurt am Main, Fed. Rep. of Germany

[21] Appl. No.: 889,316

[22] Filed: Jul. 23, 1986

[30] Foreign Application Priority Data

Jul. 25, 1985 [DE] Fed. Rep. of Germany ....... 3526601

[51] Int. Cl.$^4$ .................... G07C 69/34; B01D 17/04
[52] U.S. Cl. .................... 560/196; 560/182; 260/404; 252/341; 252/358
[58] Field of Search ............... 252/341, 358; 560/190, 560/182; 260/404

[56] References Cited

U.S. PATENT DOCUMENTS

| | | | |
|---|---|---|---|
| 2,626,914 | 1/1953 | De Groote | 252/341 |
| 2,652,407 | 9/1953 | De Groote | 252/341 X |
| 3,009,884 | 11/1961 | Monson et al. | |
| 4,606,916 | 8/1986 | Hofinger et al. | 560/196 X |

*Primary Examiner*—John F. Terapane
*Assistant Examiner*—John S. Maples

[57] ABSTRACT

Oxalkylated polyester-amines which are prepared by esterifying, with polycondensation, an oxalkylated primary fatty amine with a diol and with a dicarboxylic acid, are described. These polyester-amines are used as demulsifiers for breaking crude oil emulsions.

6 Claims, No Drawings

OXALKYLATED POLYESTER-AMINES, A PROCESS FOR THEIR PREPARATION AND THEIR USE

The invention relates to oxalkylated polyester-amines, a process for their preparation and their use as demulsifiers for crude oil emulsions.

When crude oil emulsions are recovered the crude oils recovered become increasingly diluted with water. This water recovered together with the crude oil forms a water-in-oil emulsion. Salts, such as sodium chloride, calcium chloride and magnesium chloride, can be dissolved in the emulsified water. This emulsified water must be separated off prior to transport. Before distillation, the salt content is reduced further in the refineries by a fresh emulsification with fresh water and demulsification. Too high a salt content in the crude oil can result in malfunction and corrosion in the refineries.

An emulsifier has the task of breaking the emulsion at the lowest possible concentration of material used and of effecting complete elimination of water in this separation process as far as possible without, or with only minimal, additional application of heat, and of reducing the salt content to a minimum. The quality criteria for the procurement of crude oil are its residual salt and water content.

The composition of crude oils vries, depending on their origin. The natural emulsion stabilizers have a complicated and distinctive chemical structure, for which it is necessary to develop emulsion-breakers on a specific basis. As a result of differences in the conditions of extraction and treatment the requirements which a demulsifier has to meet become even more multifarious. As a result of the continual opening up to new crude oil fields and the change in the recovery conditions of older crude oil fields, the development of optimum demulsifiers remains an acute problem, and a large number of demulsifiers or demulsifier mixtures of different compositions are required.

Nitrogen-containing demulsifiers are disclosed, in particular, in U.S. Pat. No. 3,009,884. Oxalkylated polyalkylene polyamines, esterified with polycarboxylic acids, inter alia also with dicarboxylic acids, which are effective as demulsifiers are described in this text. However, these compounds have the disadvantage of inadequate hydrophobic character, i.e. their solubility in oil is too low. However, since the effectiveness of demulsifiers for breaking crude oil emulsions depends on the extent to which they are present at the oil/water interface, this property is a disadvantage, because too high a proportion of the demulsifier is distributed over the whole aqueous phase.

The present invention provides improved agents for the purpose mentioned. These are oxalkylated polyester-amines of the general formula

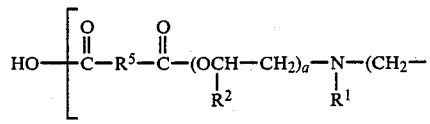
(I)

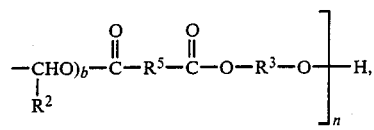

in which
$R^1$ is an alkyl radical or alkenyl radical having 8 to 23 carbon atoms,
$R^2$ is H or $CH_3$ and, arranged in blocks, can also assume both meanings within the chain of the polyoxalkylene radical,
$R^3$ denotes an alkylene radical of the formula $-(CH_2)_x-$ in which x is an integer from 1 to 6, or denotes a polyoxalkylene radical of the formula

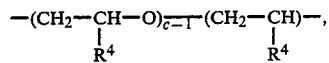

in which $R^4$ is H or $CH_3$ and, arranged statistically or in blocks, can also assume both meanings within the chain and c denotes an integer or fractional number from 2 to 80,
$R^5$ is an alkylene radical of the formula $-(CH_2)_y-$ in which y denotes an integer from 1 to 8, it being possible for this alkylene radical optionally to carry 1 to 2 OH groups, or $R^5$ is a vinylene radical,
a and b are identical or different and denote an integer or fractional number from 1 to 15 and
n is an integer which can assume values from 2 to 50.

In preferred embodiments of the invention the definitions in the formula I assume the following meaning: $R^1$ is an alkyl radical having 12 to 18 carbon atoms; $R^2$ is H and a and b are identical or different and are integers or fractional numbers from 1 to 8; $R^3$ is the radical of a block copolymer composed of at least one block of ethylene oxide units and at least one block of propylene oxide units, the total number of ethylene oxide units being an integer or fractional number from 15 to 35, the total number of propylene oxide units being an integer or fractional number from 20 to 40 and the sum of both being not more than 60; $R^5$ is an alkylene radical of the formula $-(CH_2)_y-$ in which y denotes an integer from 1 to 8; and n is an integer which can assume values from 2 to 20. The numbers a, b and c represent average values.

The compounds of the formula I are prepared by esterifying, with polycondensation, an oxalkylated primary fatty amine of the formula

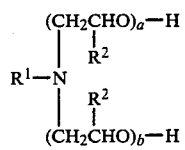

in which $R^1$, $R^2$, a and b have the meaning indicated in formula I and a diol compound of the formula HO—$R^3$OH (III) in which $R^3$ has the meaning indicated in formula I, with a dicarboxylic acid of the formula

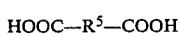   (IV)

HOOC—$R^5$—COOH in which $R^5$ has the meaning indicated in formula I, the molar ratio of oxalkylated primary fatty amine to diol compound being 1:3 to 3:1 and the molar ratio of the sum of oxalkylated primary fatty amine plus diol compound to dicarboxylic acid being 0.8:1 to 1:0.8.

It is preferable to employ the oxalkylated primary fatty amine and the diol compound in a molar ratio of 1:1 to 3:1. The molar ratio of the sum of moles of oxalkylated primary fatty amine plus diol compound to the number of moles of dicarboxylic acid is preferably 1:0.8 to 1:0.95.

The oxalkylated primary fatty amines used as the starting compounds of the formula II are obtained by known processes for oxalkylating primary fatty amines. A review of methods for the preparation of this well-known class of compounds is given in Schönfeldt, "Surface Active Ethylene Oxide Adducts", Wissenschaftliche Verlagsgesellschaft, Stuttgart, 1976, pages 70 to 73. The oxalkylated products can carry propylene oxide units, but preferably ethylene oxide units, or chains composed of both units, the two different units being arranged in blocks in the latter case.

Preferred primary amines which can be oxalkylated to give starting compounds of the formula II are the industrially available products stearylamine or coconut oil amine. However, it is equally possible, in accordance with the invention, to use other monoamines having an alkyl chain distribution of varying width or amines having a uniform chain. It is also possible to employ fatty amines, on their own or as a mixture, in which the chains contain one or more double bonds, such as, for example, the radicals of oleic, elaidic, linoleic or linolenic acid.

Oxalkylated fatty amines of this type constituted a nitrogen-containing, esterifiable diol component.

Mixed with these, a further diol component is employed, which contains no nitrogen. This diol of the formula $HO-R^3-OH$ in which $R^3$ denotes an alkylene radical of the formula $-(CH_2)_x-$ And in which x is an integer from 1 to 6 is represented, for example, by butane-1,4-diol or hexane-1,4-diol, by polyethylene glycols or polypropylene glycols or by copolymers of ethylene oxide and propylene oxide, i.e. $R^3$ is a radical of the formula

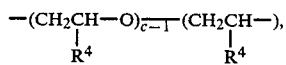

in which $R^4$ is H or $CH_3$ and c is an integer or fractional number from 2 to 80. Accordingly, within the chain, $R^4$ can also assume the meaning of H and $CH_3$, i.e. the radical $R^3$ contains units of ethylene oxide nd propylene oxide. These can be arranged statistically. Preferably, however, the radicals are those of block polymers composed of at least one block of ethylene oxide units and at least one block of propylene oxide units, the total number of ethylene oxide units being an integer or fractional number from 15 to 35, the total number of propylene oxide units being an integer or fractional number from 20 to 40 and the sum of both being not more than 60.

Block polymers which are particularly preferred are those in which ethylene oxide blocks are attached to both sides of a propylene oxide block, the total numbers of units being governed by the indications given above. The two diol component, of the formula II and of the formula III, are esterified with a dicarboxylic acid of the formula IV.

Dicarboxylic acids suitable for the esterification are aliphatic dicarboxylic acids containing $C_1$ to $C_8$ alkylene groups, such as malonic acid, succinic acid, glutaric acid, adipic acid or sebacic acid, or aliphatic dicarboxylic acids substituted by 1 to 2 OH groups, such as malic acid, tartronic acid or tartaric acid, and also fumaric acid or maleic acid. The aliphatic dicarboxylic acids having 4 to 8 carbon atoms in the alkylene radical, that is to say the homologous series from adipic acid up to sebacic acid, are particularly suitable. It is also possible to employ derivatives of such dicarboxylic acids, in particular esters and acid halides thereof, in the esterification reaction.

The esterification which proceeds with polycondensation, of the compounds of the formula II and III is carried out by known methods using a dicarboxylic acid of the formula IV in relatively high-boiling inert solvents, such as toluene or xylene, or, preferably, without a solvent in the melt and with blanketing by a protective gas. In the case of esterification in a solvent, it is expedient to select, as the reaction temperature, the temperature of reflux of the reaction mixture, and to remove by azeotropic distillation the water formed in the reaction. In the case of esterification without a diluent, the water of the reaction is distilled off directly from the reaction mixture. The reaction temperatures involved are 140° to 220° C., preferably 150° to 180° C. An acid catalyst, such as, for example, p-toluenesulfonic acid or hypophosphorous acid, is used in order to accelerate the reaction. The completeness of the reaction is monitored by determining the amine number and the acid number.

The analytical determination of the average degree of polycondensation of the resulting products and hence the average molecular weight can be carried out by chromatography by means of HPLC or HPSEC.

The products according to the invention are distinguished by an excellent demulsifying action, as is shown in Tables II to IV.

The invention is illustrated by means of the following examples:

EXAMPLE 1

(a) Preparation of a polycondensation product from adipic acid, hexane-1,6-diol and a stearylamine which has been subjected to a condensation reaction with 15 moles of ethylene oxide:

451 g (0.5 mol) of a stearylamine which has been subjected to a condensation reaction with 15 mol of ethylene oxide, 59.1 g (0.5 mol) of hexane-1,6-diol, 100.5 g (0.85 mol) of adipic acid and 1.5 g of 50% strength by weight hypophosphorous acid arre initially placed in a 1 liter reaction flask equipped with a water separator, a gas inlet tube and heating, the misture is raised to a temperature of 160° C. under a nitrogen atmosphere, and the esterification reaction is continued at this temperature with the continuous removal of water. After a reaction time of 20 hours the condensation reaction is found to be virtually complete by determining the acid number and the amine number.

The compounds of the formula I indicated in Table I below, Examples 2 to 36, are also reacted under the reaction conditions described in Example 1, with the achievement of the degrees of conversion listed:

TABLE I

| Example | Dicarboxylic acid component | Amine-oxalkylate component Amount (g)/molar ratio | Diol component | Degree of conversion to polyester-amine (in %) calculated from: acid number | amine number |
|---|---|---|---|---|---|
| 2 | Adipic acid 64.6/0.85 | A 90.5/0.5 | N 460.2/0.5 | 94 | 100 |
| 3 | Adipic acid 199/0.85 | A 278/0.5 | P 258/0.5 | 96 | 100 |
| 4 | Adipic acid 49.7/0.85 | A 69.5/0.5 | O 631.7/0.5 | 95 | 100 |
| 5 | Adipic acid 218.5/0.833 | A 315/0.5 | R 106.4/0.5 | 99 | 100 |
| 6 | Adipic acid 121.7/0.83 | A 174.8/0.5 | Q 201.1/0.5 | 99 | 92 |
| 7 | Adipic acid 91.3/0.833 | B 233.4/0.8 | Q 60.0/0.2 | 96 | 100 |
| 8 | Adipic acid 39.3/0.83 | C 68.3/0.5 | N 274.2/0.5 | 88 | 100 |
| 9 | Adipic acid 62.1/0.85 | D 148.4/0.5 | N 442.5/0.5 | 95 | 99 |
| 10 | Adipic acid 82.7/0.85 | D 290.4/0.75 | O 433.1/0.25 | 92 | 100 |
| 11 | Adipic acid 41.4/0.85 | D 48.4/0.25 | O 652.2/0.75 | 91 | 100 |
| 12 | Adipic acid 121.7/0.83 | E 271.0/0.5 | Q 201/0.5 | 89 | 100 |
| 13 | Adipic acid 124.3/0.85 | F 451/0.5 | Q 197/0.5 | 93 | 96 |
| 14 | Adipic acid 49.7/0.85 | F 354/0.5 | N 180.4/0.5 | 95 | 100 |
| 15 | Adipic acid 37.2/0.85 | F 135.3/0.5 | O 379/0.5 | 94 | 100 |
| 16 | Adipic acid 100.5/0.85 | F 451/0.5 | R 59.1/0.5 | 99 | 100 |
| 17 | Adipic acid 124.3/0.85 | F 450.9/0.5 | P 161.2/0.5 | 97 | 84 |
| 18 | Adipic acid 174/0.85 | G 522.6/0.5 | R 82.7/0.5 | 100 | 96 |
| 19 | Adipic acid 124.3/0.85 | G 373.3/0.5 | P 161.2/0.5 | 89 | 87 |
| 20 | Adipic acid 124.3/0.85 | G 374/0.5 | Q 197/0.5 | 99 | 99 |
| 21 | Adipic acid 248.5/0.85 | H 377.8/0.5 | R 118.2/0.5 | 99 | 100 |
| 22 | Adipic acid 194.0/0.85 | H 302.2/0.5 | P 257.9/0.5 | 94 | 99 |
| 23 | Adipic acid 161.6/0.85 | H 245.6/0.5 | Q 256.1/0.5 | 97 | 99 |
| 24 | Adipic acid 174.0/0.85 | I 451.5/0.5 | Q 276.0/0.5 | 98 | 100 |
| 25 | Adipic acid 149.1/0.85 | I 386.9/0.5 | P 193.4/0.5 | 89 | 100 |
| 26 | Adipic acid 161.6/0.83 | I 454.6/0.5 | R 76.8/0.5 | 99 | 93 |
| 27 | Adipic acid 82.7/0.85 | J 145.7/0.75 | O 433.1/0.25 | 99 | 89 |
| 28 | Adipic acid 49.7/0.85 | J 29.1/0.75 | O 782.7/0.75 | 97 | 100 |
| 29 | Adipic acid 36.6/0.83 | M 82.9/0.5 | O 377.4/0.5 | 98 | 100 |
| 30 | Adipic acid 48.5/0.83 | K 70.3/0.5 | O 521.8/0.5 | 96 | 100 |
| 31 | Adipic acid 121.7/0.833 | K 175.9/0.5 | Q 201/0.5 | 95 | 96 |
| 32 | Adipic acid 99.3/0.85 | K 211/0.75 | N 340/0.25 | 99 | 99 |
| 33 | Adipic acid 74.5/0.85 | K 158.3/0.75 | O 391.4/0.25 | 98 | 97 |
| 34 | Adipic acid 74.5/0.85 | L 238.1/0.75 | O 391.3/0.25 | 93 | 100 |
| 35 | Adipic acid 41.4/0.85 | L 44.1/0.25 | O 652.2/0.75 | 90 | 100 |
| 36 | Adipic acid 69.4/1.0 | D 172.1/0.63 | O 258.7/0.22 | 97.5 | 99 |

The abbreviations used in Table I have the following meanings:

A = stearylamine, condensed with 2 moles of ethylene oxide

B=stearylamine, condensed with 3 moles of ethylene oxide
C=stearylamine, condensed with 5 moles of ethylene oxide
D=stearylamine, condensed with 8 moles of ethylene oxide
E=stearylamine, condensed with 10 moles of ethylene oxide
F=stearylamine, condensed with 15 moles of ethylene oxide
G=oleylamine, condensed with 12 moles of ethylene oxide
H=tallow fat alkylamine, condensed with 2 moles of ethylene oxide
I=tallow fat alkylamine, condensed with 10 moles of ethylene oxide
J=coconut oil alkylamine, condensed with 2 moles of ethylene oxide
K=coconut oil alkylamine, condensed with 5 moles of ethylene oxide
L=coconut oil alkylamine, condensed with 10 moles of ethylene oxide
M=coconut oil alkylamine, condensed with 2 moles of ethylene oxide and 5 moles of propylene oxide
N=block polymer formed from 32 moles of propylene oxide and 4 moles of ethylene oxide
O=block polymer formed from 32 moles of propylene oxide and 28 moles of ethylene oxide
P=polypropylene glycol, molecular weight 400
Q=polyethylene glycol, molecular weight 400
R=hexane-1,6-diol

TABLE II

Origin of crude oil emulsion: Saudi Arabia
Water content of emulsion: 36% by volume
Salt content of crude oil emulsion: 9.7% by weight
Demulsification temperature: 60° C.
Amount metered in: 32 ppm

| Emulsion breaker type from Example | Water separation in % by volume after ... minutes | | | | | Residual salt content, % by weight in the oil phase |
|---|---|---|---|---|---|---|
| | 10 | 20 | 30 | 40 | 60 | |
| 15 | 63 | 76 | 82 | 88 | 94 | 0.09 |
| 27 | 91 | 95 | 98 | 100 | 100 | 0.01 |
| 34 | 83 | 88 | 93 | 98 | 100 | 0.03 |
| 36 | 50 | 91 | 90 | 99 | 100 | 0.02 |
| Blank value | 0 | 0 | 0 | 0 | 0 | 4.84 |

TABLE III

Origin of crude oil emulsion: Nigeria
Water content of crude oil emulsion: 17.5% by volume
Demulsification temperature: 45° C.
Amount metered in: 55 ppm

| Emulsion breaker type from Example | Water separation in % by volume after ... minutes | | | | | Residual water content, % by volume in the oil phase |
|---|---|---|---|---|---|---|
| | 10 | 20 | 30 | 60 | 90 | |
| 15 | 60 | 81 | 91 | 100 | 100 | 0.04 |
| 27 | 89 | 93 | 98 | 100 | 100 | 0.02 |
| 34 | 3 | 10 | 62 | 98 | 99 | 0.15 |
| 36 | 48 | 68 | 75 | 99 | 100 | 0.07 |
| Blank value | 0 | 0 | 0 | 0 | 0 | 3.57 |

TABLE IV

Origin of crude oil emulsion: Schleswig-Holstein
Water content of crude oil emulsion: 63% by volume
Salt content of crude oil emulsion: 14.8% by weight
Demulsification temperature: 55° C.
Amount metered in: 45 ppm

| Emulsion breaker type from Example | Water separation in % by volume after ... hours | | | | | Residual salt content, % by weight in the oil phase |
|---|---|---|---|---|---|---|
| | 1 | 3 | 12 | 24 | 48 | |
| 15 | 71 | 74 | 88 | 98 | 99 | 0.11 |
| 27 | 79 | 84 | 91 | 99 | 100 | 0.07 |
| 34 | 5 | 11 | 64 | 99 | 100 | 0.09 |
| 36 | 22 | 45 | 74 | 97 | 99 | 0.18 |
| Blank value | 0 | 0 | 0 | 0 | 0 | 7.65 |

We claim:

1. An oxalkylated polyester-amine of the formula $$HO \left[ \begin{array}{c} O \\ \| \\ C-R^5-C-(OCH-CH_2)_a-N-(CH_2- \\ | \quad\quad | \\ R^2 \quad\quad R^1 \end{array} \right.$$

$$\left. \begin{array}{c} O \quad\quad O \\ \| \quad\quad \| \\ -CHO)_b-C-R^5-C-O-R^3-O \\ | \\ R^2 \end{array} \right]_n H, \quad (I)$$

in which
$R^1$ is an alkyl radical or alkenyl radical having 8 to 23 carbon atoms,
$R^2$ is H or $CH_3$ and, arranged in blocks, can also assume both meanings within the chain of the polyoxalkylene radical,
$R^3$ denotes an alkylene radical of the formula $-(CH_2)_x-$ in which x is an integer from 1 to 6, or denotes a polyoxalkylene radical of the formula $$-(CH_2-CH-O)_{\overline{c-1}}(CH_2-CH)-,$$
$$\quad\quad | \quad\quad\quad\quad\quad\quad\quad |$$
$$\quad\quad R^4 \quad\quad\quad\quad\quad\quad R^4$$

in which $R^4$ is H or $CH_3$ and, arranged statistically or in blocks, can also assume both meanings within the chain and c denotes an integer or fractional number from 2 to 80,
$R^5$ is an alkylene radical of the formula $-(CH_2)_y-$ in which y denotes an integer from 1 to 8, it being possible for this alkylene radical optionally to carry 1 to 2 OH groups, or $R^5$ is a vinylene radical,
a and b are identical or different and denote an integer or fractional number from 1 to 15 and
n is an integer which can assume values from 2 to 50.

2. An oxalkylated polyester-amine as claimed in claim 1, wherein $R^1$ is an alkyl radical having 12 to 18 carbon atoms.

3. An oxalkylated polyester-amine as claimed in claim 1, wherein $R^2$ is H and a and b are identical or different and are an integer or fractional number from 1 to 8.

4. An oxalkylated polyester-amine as claimed in claim 1, wherein $R^3$ is the radical of a block copolymer composed of at least one block of ethylene oxide units and at least one block of propylene oxide units, the total number of ethylene oxide units being an integer or fractional number from 15 to 35, the total number of propylene oxide units being an integer or fractional number from 20 to 40 and the sum of both being not more than 60.

5. An oxalkylated polyester-amine as claimed in claim 1, wherein $R^5$ is an alkylene radical of the formula $-(CH_2)_y-$ in which y is an integer from 1 to 8.

6. An oxalkylated polyester-amine as claimed in claim 1, wherein n is an integer which can assume values from 2 to 20.

* * * * *